US 8,755,038 B2

(12) United States Patent
Smith

(10) Patent No.: US 8,755,038 B2
(45) Date of Patent: Jun. 17, 2014

(54) OPTICAL FIBER FAULT LOCATOR

(75) Inventor: Bryan Smith, Cullman, AL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 498 days.

(21) Appl. No.: 13/048,360

(22) Filed: Mar. 15, 2011

(65) Prior Publication Data

US 2012/0236294 A1 Sep. 20, 2012

(51) Int. Cl.
*G01N 21/00* (2006.01)
*H04B 17/00* (2006.01)
*G01M 11/00* (2006.01)
*H04B 10/07* (2013.01)
*H04B 10/071* (2013.01)

(52) U.S. Cl.
CPC .......... *G01M 11/3109* (2013.01); *G01M 11/31* (2013.01); *G01M 11/3136* (2013.01); *G01M 11/3154* (2013.01); *H04B 10/07* (2013.01); *H04B 10/071* (2013.01)
USPC ................. 356/73.1; 398/9; 398/10; 398/13; 398/17; 398/20; 398/21; 250/559.43; 250/227.14; 250/227.15; 250/227.16; 250/227.18; 250/227.17

(58) Field of Classification Search
CPC ............ G01M 11/3109; G01M 11/31; G01M 11/3136; G01M 11/3154; H04B 10/07; H04B 10/071
USPC ............... 356/73.1; 398/9, 10, 13, 17, 20, 21; 250/559.43, 227.14–227.18
See application file for complete search history.

(56) References Cited

U.S. PATENT DOCUMENTS

| 4,289,398 | A   | * | 9/1981  | Robichaud ............... 356/73.1 |
| 5,090,018 | A   | * | 2/1992  | Murphy et al. ............ 372/30 |
| 7,373,609 | B2  | * | 5/2008  | Zaner et al. ............... 715/753 |
| 2010/0166357 | A1 | * | 7/2010  | Huffman et al. ............ 385/12 |
| 2010/0238429 | A1 | * | 9/2010  | Hayward et al. ........... 356/73.1 |
| 2010/0322620 | A1 | * | 12/2010 | Wellbrock et al. .......... 398/18 |
| 2011/0085159 | A1 | * | 4/2011  | Levin et al. ................ 356/73.1 |

OTHER PUBLICATIONS

AFL Telecommunications, "Fiber Optic Loss Test Kits", Test & Inspection, 1 page; Revision Apr. 1, 2005.*
EXFO Electro-Optical Engineering Inc. "AXS-100 Series Handheld OTDR", 2009; 8 pp.
EXTO Electro-Optical Engineering Inc. "FTB-150 Compact OTDR", 2009, 8 pp.
"Hand-Held OTDR Includes Power Meter and Fault Detector" from Photonics.com, Apr. 1, 2008, 1 pp.
U.S. Appl. No. 12/899,636, filed Oct. 7, 2010; 28 pp.

* cited by examiner

*Primary Examiner* — Tarifur Chowdhury
*Assistant Examiner* — Sunghee Y Gray
(74) *Attorney, Agent, or Firm* — Toler Law Group, PC

(57) ABSTRACT

A method includes applying pulsed light to a first end of an optical fiber from an optical fault locator during a first distance test. The method includes determining an estimated distance to a fault based on the pulsed light. The method includes sending information indicative of the estimated distance to a remote device. The method also includes applying first visible light from the optical fault locator to the first end of the optical fiber to facilitate identification of the fault at a first site that is remote from the first end of the optical fiber.

18 Claims, 4 Drawing Sheets

OPTICAL FIBER FAULT LOCATOR

FIELD OF THE DISCLOSURE

The present disclosure relates generally to optical fiber fault locators.

BACKGROUND

A visual fault locator (VFL) applies visible light to an optical fiber at a first end of the optical fiber. Visual detection of the visible light at a different location of the optical fiber (e.g., at a second end of the optical fiber) may confirm continuity of the optical fiber or may identify a location of a fault, a faulty connection, or a bad splice in the optical fiber.

An optical time-domain reflectometer (OTDR) tester applies a series of pulses of light to an optical fiber at a first end of the optical fiber. Strength of measured return pulses at the first end of the optical fiber may be analyzed to determine properties of the optical fiber. A simplified form of an OTDR tester is a handheld device that may be used to estimate a distance to an area of high reflectance.

DETAILED DESCRIPTION

Figure 1:
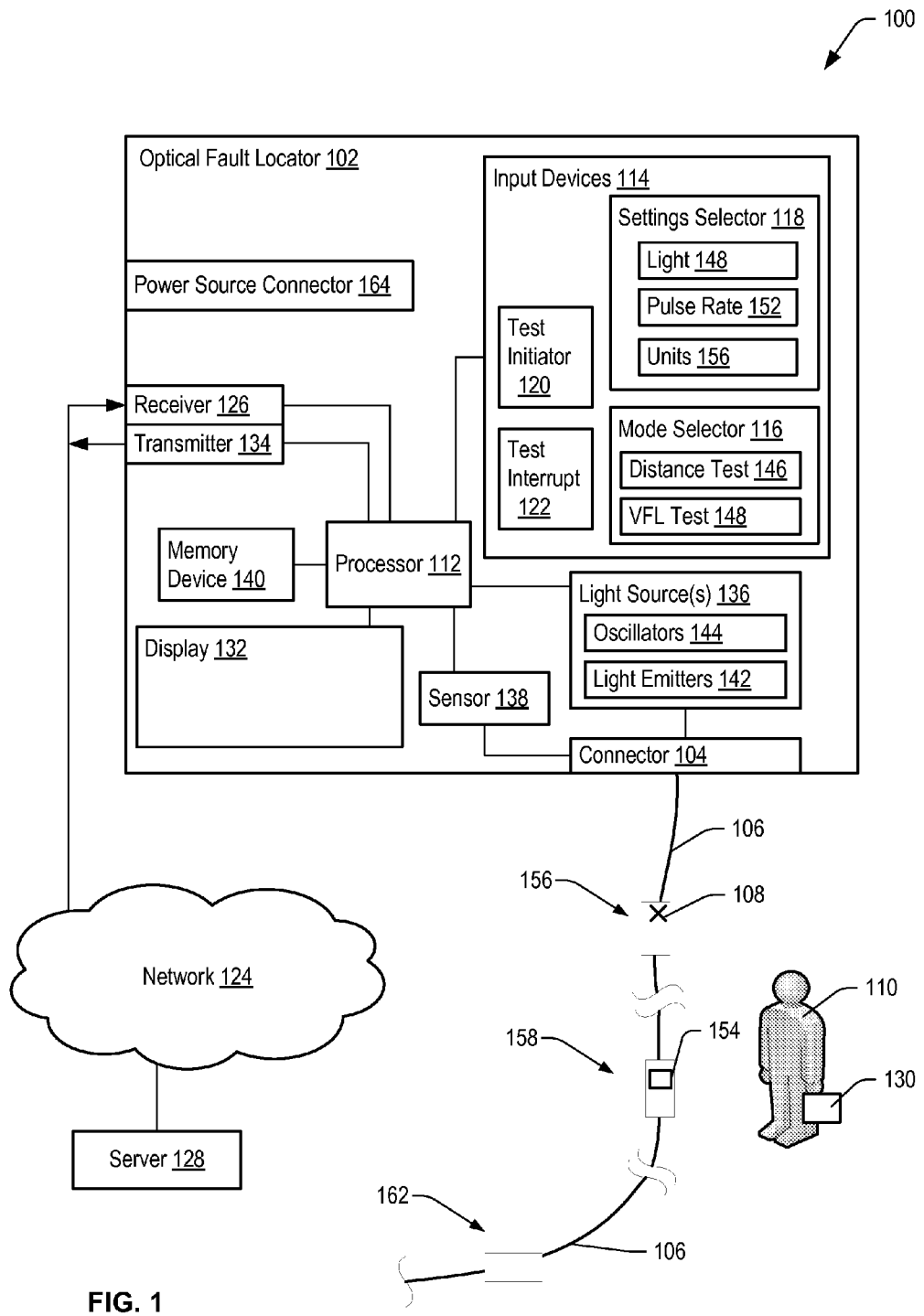
FIG. 1 is a block diagram that illustrates a particular embodiment of an optical fault locator.

An optical fault locator may function in two operational modes. In a first mode, the optical fault locator may perform a distance test, such as an optical time-domain reflection test, to provide an estimate of a distance to an area of high reflectivity in an optical fiber coupled to the optical fault locator. In a second mode, the optical fault locator may perform a visual fault location test by applying visible light to the optic fiber to enable a technician to visually identify a location of a fault. Using the optical fault locator, the technician may perform several troubleshooting steps, e.g., the distance test and the visual fault location test, using a single test instrument. Additionally, the troubleshooting steps can be performed without disconnecting the optical fault locator. The optical fault locator may also enable the technician to remotely control settings for the optical fault locator and to select the operational mode of the optical fault locator.

In a particular embodiment, a device includes a connector configured to couple the device to an optical fiber. The light source is configured to generate light. The device includes at least one selector operable to change a mode of the device between a distance test operating mode and a visual test operating mode. The device includes an oscillator that is operable in the distance test operating mode to send pulses of light from the light source to a first end of the optical fiber. The device includes a sensor coupled to the connector. The sensor is operable in the distance test operating mode to detect light reflected by a fault in the optical fiber. The device includes a processor that is operable in the distance test operating mode to determine an estimated distance to the fault in response to the sensor detecting the light reflected by the fault. The device also includes a receiver that enables remote selection of either the distance test operating mode or the visual test operating mode. In the visual test operation mode, visible light from the light source is provided to the optical fiber.

In a particular embodiment, a method includes applying pulsed light to a first end of an optical fiber from an optical fault locator during a first distance test. The method includes determining a first distance to a fault based on the pulsed light. The method includes sending information indicative of the first distance to a remote device. The method also includes applying visible light from the optical fault locator to the first end of the optical fiber to facilitate identification of the fault by a user of the optical fault locator at a first site that is remote from the first end of the optical fiber.

In a particular embodiment, a tangible computer-readable medium includes instructions that are executable by a processor. The instructions are executable by the processor to receive a signal from a remote device to perform a distance test. The instructions are executable by the processor to instruct a first light source to send a plurality of pulses of light to a connector coupled to a first end of an optical fiber in response to the signal. The instructions are executable by the processor to receive reflection data including information regarding reflected pulses detected by a sensor. The instructions are executable by the processor to determine an estimated distance to a fault in the optical fiber based on the reflection data. The instructions are executable by the processor to receive a second signal from the remote device to perform a visual fault test. The instructions are also executable by the processor to instruct a second light source to send visible light to the connector to perform the visual fault location test in response to the second signal.

FIG. 1 is a block diagram of a particular embodiment of a system 100 that includes an optical fault locator 102. A connector 104 of the optical fault locator 102 may be coupled to an optical fiber 106 (e.g., at a first end of the optical fiber 106. The optical fault locator 102 may be used to detect a fault 108 in the optical fiber 106. The optical fiber 106 may be a component of a communication system. The fault 108 may be, but is not limited to, a damaged portion of the optical fiber 106, a break, a split, a bad splice, a bad connection, or combinations thereof. A user 110 may utilize the optical fault locator 102 to determine a location of the fault 108.

The optical fault locator 102 may include a processor 112 that controls operation of the optical fault locator 102. The processor 112 may receive user input from one or more input devices 114. The input devices 114 may include, for example, a keyboard, a touch screen, a switch, a dial, a button, a mouse, another input device, or combinations thereof. The input devices 114 may include a mode selector 116, a settings selector 118, a test initiator 120, and a test interrupt 122. The processor 112 may receive information about the operation of the optical fault locator 102 from the mode selector 116 and the settings selector 118 when the user 110 provides input at the optical fault locator 102. The processor 112 may begin a test specified by the mode selector 116 when the test initiator 120 is activated at the optical fault locator 102. The processor 112 may stop the test specified by the mode selector 116 when the test interrupt 122 is activated at the optical fault locator 102.

In a particular embodiment, the optical fault locator 102 can also be controlled remotely. For example, the optical fault locator 102 may receive information specifying settings or commands from one or more external devices via a network 124 at a receiver 126. The receiver 126 may send the received information specifying the settings and commands to the processor 112. The external devices may include, for example, a server 128 or other device of a service provider associated with the optical fiber 106. In another example, the external device may include a device 130 that is associated with the user 110 or the optical fault locator 102, such as a tablet computer, a laptop computer, a mobile communication device, a dedicated remote control device (i.e., a device that is dedicated to control of the optical fault locator 102), another wireless device, or combinations thereof. The settings and commands received by the processor 112 via the receiver 126 may correspond to settings and commands available to the user 110 via the mode selector 116, the settings selector 118, and the test initiator 120 of the input devices 114. The device 130 may run software, access a webpage, or otherwise receive an interface that facilitates communication of the settings and commands from the device 130 to the optical fault locator 102 and facilitates the display of information received by the device 130 from the optical fault locator 102.

The processor 112 may send information indicating an operational status of the optical fault locator 102 and test results (e.g., results of optical time-domain reflectance tests) to a display 132. The processor 112 may also send the information indicating the operational status and the test results to one or more external devices (e.g., the server 128 or the device 130) via a transmitter 134. The transmitter 134 and the receiver 126 may communicate with one another or with one or more external devices (e.g., with the server 128 and the device 130) via a wireless communication system, via a dial-up communication system, via a satellite communication system, via another type of communication system, or combinations thereof.

The operational status and the test results may be sent to the external device in a desired format, including but not limited to, electronic mail, text message, voice message, streaming feed, link to a web page, and combinations thereof. For example, when the optical fault locator 102 runs a distance test, the processor 112 may send to the display 132 and to the device 130 information indicating a time when the distance test started. When the distance test is completed, the processor 112 may send to the display 132 and to the device 130 information indicating a time when the distance test ended and information indicative of results of the distance test (e.g., a distance to a region of the optical fiber 106 that has high reflectance). As another example, when the optical fault locator 102 is running a visual fault location test, the processor 112 may send to the display 132 and to the device 130 information indicating a time when the visual fault location test started, information indicating a type (e.g., a wavelength or wavelength range) of light applied to the optical fiber 106 from a light source 136, information indicating a pulse rate of the light, other information related to the visual fault test, or a combination thereof. The pulse rate may be zero when continuous light is applied to the optical fiber 106. When the visual fault location test is complete, the processor 112 may send to the display 132 and to the device 130 information indicating a time when the visual fault location test ended.

The processor 112 may control operation of the light source 136 based on the information received via the mode selector 116, the settings selector 118, the receiver 126, or combinations thereof. When the processor 112 initiates a distance test in response to activation of the test initiator 120 or in response to information received via the receiver 126, the processor 112 may receive an indication of when pulses of light are, or are to be, applied to the optical fiber 106. For example, the pulses of light may be applied to the optical fiber 106 at a fixed pulse rate by the light source 136. The indication of when the pulses of light are, or are to be, applied to the optical fiber 106 and parameters of the distance test, such as a pulse length and a pulse rate of the light, may enable the processor 112 to calculate when pulses of light are, or are to be, applied to the optical fiber 106.

The processor 112 may also receive reflection data from a sensor 138 (e.g., an optical time-domain reflectometer sensor). The reflection data received from the sensor 138 may include times when reflected pulses of light from the optical fiber 106 are received by the sensor 138, intensities or strengths of the reflected pulses, other information related to light sensed by the sensor 138, or combinations thereof. The processor 112 may use the reflection data and information about when the pulses of light are applied to the optical fiber 106 to calculate an estimated distance from an end of the optical fiber 106 coupled to the connector 104 to a region of high reflectance in the optical fiber 106. The processor 112 may detect the region of high reflectance by integrating an intensity or strength of the reflected pulses as a function of time. In a particular example, the region of high reflectance may correspond to a location of a fault, such as the fault 108. In other examples, the region of high reflectance may correspond to a location of a bend in the optical fiber 106 formed by the user 110 to determine a direction to the fault 108 or another high reflectance area in the optical fiber 106.

The processor 112 may be coupled to a memory device 140. The memory device 140 may include memory that is integral to the processor 112, memory that is external to the processor 112, or both. The memory device 140 may include instructions that the processor 112 executes to operate the optical fault locator 102. The memory device 140 may also be used to store information regarding usage of the optical fault locator 102. The information may include settings used for a particular test, a time when a particular test was initiated, a time when a particular test was completed, and results of the particular test (when the particular test generates a quantifiable result). The memory device 140 may also include one or more diagnostic routines that the processor 112 may execute during maintenance or during troubleshooting of a problem associated with the optical fault locator 102 or during execution of a particular test.

The connector 104 of the optical fault locator 102 may couple the light source 136 and the sensor 138 to the optical fiber 106. The connector 104 may include one or more lenses that facilitate transmission of light from the light source 136 to the optical fiber 106 and transmission of reflected pulses of light from the optical fiber 106 to the sensor 138.

The light source 136 of the optical fault locator 102 may provide light to the optical fiber 106 via the connector 104. The characteristics of the light provided by the light source 136 may be determined by the processor 112 based on information received from the mode selector 116, the settings selector 118, the receiver 126, or combinations thereof. The light source 136 may include one or more light emitters 142 and one or more oscillators 144. Each of the one or more light emitters 142 may provide light having a particular spectrum (e.g., a wavelength or a range of wavelengths). The light emitters 142 may include one or more light emitting diodes. The light emitters 142 may include at least one light emitter that provides light in a visible spectrum. That is, the at least one light emitter may provide light having a wavelength that is detectable by a human eye (e.g., from about 400 nm to about 700 nm). For example, the one or more light emitters 142 may include at least one light emitter that produces light with a wavelength of about 670 nm, which is visible to the human eye as a red light. The light emitters 142 may also include at least one light emitter that produces light with a wavelength of about 550 nm, which is visible to the human eye as a green light. Visible light may be applied to the optical fiber 106 by the optical fault locator 102 when the optical fault locator 102 is performing a visual fault location test, a distance test, or both. The one or more light emitters 142 may also include one or more light emitters that provide light in a wavelength that is not visible to the human eye. For example, the optical fault locator 102 may apply light that is not visible to the human eye to the optical fiber 106 when the optical fault locator 102 is running a distance test. In a particular embodiment, two or more of the light emitters 142 may be used concurrently or simultaneously to apply light to the optical fiber 106. For example, different colors of light that are visible to the human eye may be generated by mixing light from two or more of the light emitters 142.

The oscillators 144 may interact with the light emitters 142 to provide pulsed light to the optical fiber 106 through the connector 104. For example, a particular oscillator may provide pulsed light during a distance test so that the optical fault locator 102 can provide an estimate of a distance to the fault 108. A particular oscillator may be used during a visual fault location test so that the light provided to the optical fiber 106 from the light source 136 has an identifiable characteristic (e.g., a particular pulse rate, pulse length, or pulse pattern) that the user 110 can detect to identify a location of the optical fiber 106 from which the light is emitted. Verifying that the light emitted from the optical fiber 106 has the same identifiable characteristic as the light provided to the optical fiber 106 from the light source 136 may facilitate identifying the location of the fault 108.

The mode selector 116 of the optical fault locator 102 may enable the user 110 to specify which test or tests the optical fault locator 102 will perform when the run test initiator 120 is selected. The mode selector 116 may be a mechanical selector (e.g., a dial switch), a menu presented at the display 132, or another input device. For example, the mode selector 116 may enable the user 110 to select between a distance test option 146, a visual fault location test option 148, other test options (e.g., a single test mode for the distance test; a real-time mode for the distance test; or a reciprocating test mode that repeatedly runs a distance test for a first time period followed by a visual fault test for a second time period), or a combination thereof. The settings selector 118 may enable the user to specify settings of the optical fault locator 102 to be used for one or more tests, such as a distance test, a visual fault location test, or both. The settings selector 118 may be a plurality of mechanical selectors, a menu presented at the display 132, another input device, or combinations thereof. The settings selector 118 may include a light selector 150, a pulse rate selector 152, a units selector 156, another setting selector, or a combination thereof. The light selector 150 may enable the user 110 to select a particular spectrum or wavelength of light that is to be applied to the optical fiber 106 during a particular test (e.g., during a visual fault location test or a distance test). For example, the light selector 150 may enable the user 110 to select to apply visible red light, green light, or another color of light to the optical fiber 106 from the light source 136. When the user 110 selects a particular option available via the light selector 150, the processor 112 may activate one or more of the light emitters 142 to provide the specified light when the test is initiated. The light selector 150 may also enable the user 110 to select whether the light source 136 will apply visible light, non visible light, or both to the optical fiber 106 during the distance test.

The pulse rate selector 152 may enable the user 110 to select a particular pulse rate of light provided by the light source 136 to the optical fiber 106 during a test. When the user 110 selects a particular pulse rate, the processor 112 may cause an oscillator of the one or more oscillators 144 to provide light with the selected pulse rate when the test is initiated. The rate selector 152 may allow the user 110 to select one or more pulse rates that are detectable by a human (e.g., pulse rates of 0.1 Hz, 1 Hz, and 2 Hz), and one or more pulse rates that are not detectable by a human (e.g., pulse rates of 270 Hz, 1 kHz, and 2 kHz). The user 110 may utilize an optical detector 154 to verify that the pulse rate of light emitted from the optical fiber 106 at a particular location has the selected pulse rate.

The units selector 156 may enable the user 110 to specify that test results are to be displayed in particular units. For example, results of a distance test performed by the optical fault locator 102 may be specified in feet, kilofeet, miles, meters, kilometers, or another distance unit. The result of the distance test may be sent to the display 132, the device 130 associated with the user 110, and any other devices (e.g., the server 128) that are to receive the result in the units designated by the units selector 156.

The test initiator 120 may be used to initiate a test specified by the mode selector 116 at the optical fault locator 102. The test initiator 120 may be a mechanical selector (e.g., a button), a selectable option presented on the display 132, or both. When the mode selector 116 is set to the distance test option 146 and the test initiator 120 is activated, the optical fault locator 102 may provide pulsed light to the optical fiber 106 for a predetermined period of time to conduct the distance test. The pulsed light may be light in a spectrum that is not visible to the human eye or light in a spectrum that is visible to the human eye. The use of light that is not visible to the human eye may allow the optical fault locator 102 to concurrently provide the pulsed light for the distance test and visible light for the visual fault location test. The use of light that has a spectrum that is visible to the human eye may allow the user 110 to detect the location of the fault 108 without the need to provide two separate light spectrums to the optical fiber 106. A pulse length of the pulsed light may be short (e.g., about 500 nsec or less) so that the optical fault locator 102 is able to provide acceptable resolution of a distance to an area of high reflectance (e.g., the fault 108).

When the mode selector is set to the visual fault location test option 148 and the test initiator 120 is activated, the optical fault locator 102 may provide visible light to the optical fiber 106 to conduct the visual fault location test. The optical fault locator 102 may provide the visual light to the optical fiber 106 for a predetermined period of time after the visual fault location test option 148 is activated. Alternately, the optical fault locator 102 may provide the visual light to the optical fiber 106 until input to deactivate the visual fault test is received (e.g., via the receiver 126 or via any of the input devices 114). For example, the user 110 may stop the visual fault test by actuating the visual fault location test option 148, by actuating a separate visual fault location test interrupt, or by sending an interrupt command to the optical fault locator 102 from the device 130 associated with the user 110. During the visual fault test, the user 110 may visually inspect a portion of the optical fiber 106, or use the optical detector 154 on one or more portions of the optical fiber 106, to determine the location of the fault 108 at a worksite (e.g., at one of sites 158, 160, and 162). The sites 158-162 may be, but are not limited to a site of a splice closure, an equipment room site, or other access points to the optical fiber 106. The fault 108 may be identified by light emanating from the optical fiber 106 at a particular location.

The optical fault locator 102 may include a power source connector 164. The power source connector 164 may allow the optical fault locator 102 to be coupled to a power source that supplies power to components of the optical fault locator 102. The power source connector 164 may be a battery connector to couple to a battery, a power cord to couple to an electrical power grid, a connector to an alternate power source (e.g., a connector to a solar panel), or combinations thereof.

During use, the user 110 may couple a first end of an optical fiber to be tested, such as the optical fiber 106, to the connector 104. The first end of the optical fiber 106 may be located at or near a customer premises or at or near an equipment room of a service provider associated with the optical fiber 106 (e.g., a central office). The user 110 may use the input devices 114 to specify settings of a first distance, settings of a first visual fault location test, or both. The user 110 may provide information to the optical fault locator 102 that enables the optical fault locator 102 to remotely communicate with the device 130. For example, the user 110 may initiate a communication connection between the device 130 and the optical fault locator 102. Alternately or in addition, the user 110 may input a communication address associated with the optical fault locator 102 into the device 130, may input a communication address associated with the device 130 into the optical fault locator 102, or both. The user may test that the optical fault locator 102 is able to communicate with the device 130.

To perform the first distance test, the user 110 may set the mode selector 116 to the distance test option 146. The user may also choose one or more settings using the settings selector 118. The user 110 may activate the test initiator 120 at the optical fault locator 102, or the user 110 may go to the first site 158 and remotely activate the first distance test. In some embodiments, the optical fault locator 102 may automatically perform a visual fault location test for a predetermined or specified period of time before, during or after the completion of a distance test. The user 110 may read a result of the first distance test from the display 132 or from the device 130.

The user 110 may set the optical fault locator 102 to perform the first visual fault location test and initiate the first visual fault location test. For example, the user 110 may initiate the first visual fault location test remotely, e.g., while the user 110 is at the first site 158. In some instances, light in a visible spectrum that is emitted from a fault in the optical fiber 106 may not be visible or may not be readily visible to the human eye. For example, when the fault is a large distance from the optical fault locator 102, the light may be too attenuated to be detectable by the human eye. In such an instance, the result of the first distance test may indicate that the optical detector 154 should be used to detect the visible light and the optical fault locator 102, the device 130, or both, may generate an indication notifying the user 110 to use the optical detector 154. When the user 110 detects light emanating from the optical fiber 106 at the first site during the visual fault location test, the user 110 may verify that the emanating light has characteristics of the light applied by the optical fault locator 102 to the optical fiber 106 (e.g., the same wavelength, the same pulse rate, the same pulse length, the same pulse pattern, etc.). The user 110 may also remotely switch the optical fault locator 102 using the device 130 to apply light having different characteristics (e.g., a different pulse rate, a different wavelength, a different pulse length, a different pulse pattern, or a combination thereof) to the optical fiber 106 to verify that the detected light is the light applied by the optical fault locator 102. After the user 110 has identified the location of the fault 108, the user 110 may repair the optical fiber 106. After repairing the optical fiber 106, the user 110 may run additional tests to identify additional faults in the optical fiber 106, to verify the repair, or both.

When the user 110 does not detect light emanating from the optical fiber 106 at the first site 158, the user 110 may bend the optical fiber to temporarily create a region of high reflectance. The user 110 may then initiate a second distance test using the device 130 to determine a second distance. The user may compare a result of the second distance test to the result of the first distance test. When a difference between the distance test results is substantially zero (e.g., is within a measurement error of the distance tests), the optical fault locator 102 may be identifying the same region of the optical fiber 106 in both distance tests (i.e., the region that is being detected by the first and second distance tests is between the bend in the optical fiber 106 and the optical fault locator 102). When the difference between the tests is substantially zero, the user 110 may move to a second site that is closer to the end of the optical fiber 106 coupled to the optical fault locator 102. For example, the user 110 may move from the site 158 to a second site 160. When the difference between the result of the first distance test and the result of the second distance test is a positive number that is not substantially zero, the optical fault locator 102 may be identifying the bend in the optical fiber 106 instead of the fault 108. When the difference between the result of the first distance test and the result of the second distance test is the positive number, the user 110 may release the bend in the optical fault locator 102 and may move to a second site that is further away from the end of the optical fiber 106 coupled to the optical fault locator 102. For example, the user 110 may move from the site 158 to site to a third site 162. The difference between the test results may indicate an approximate distance between the site 158 and the third site 162.

When the user 110 is at the third site 162, the user 110 may use the device 130 to remotely activate the optical fault locator 102 to perform a subsequent visual fault location test. The subsequent visual fault location test may be performed using the same settings as the previous visual fault test (e.g., the same pulse rate selection, same wavelength of light, same pulse length, same pulse pattern, etc.) or the user 110 may remotely specify one or more different settings for the subsequent visual fault location test. When the user 110 detects light emanating from the optical fiber 106 at the third site 162, the user 110 may confirm that the detected light is the light being applied to the optical fiber 106 by the optical fault locator 102, and the user 110 may repair the optical fiber 106. When the user 110 does not find the fault 108 at the third site 162, the user 110 may repeat the procedure of bending the optical fiber 106, using the device 130 to remotely initiate another distance test, moving to a new site based on a difference between a most recent distance test and a previous distance test (e.g., the first distance test), and performing an additional visual fault location test to locate the fault 108.

Figure 2:
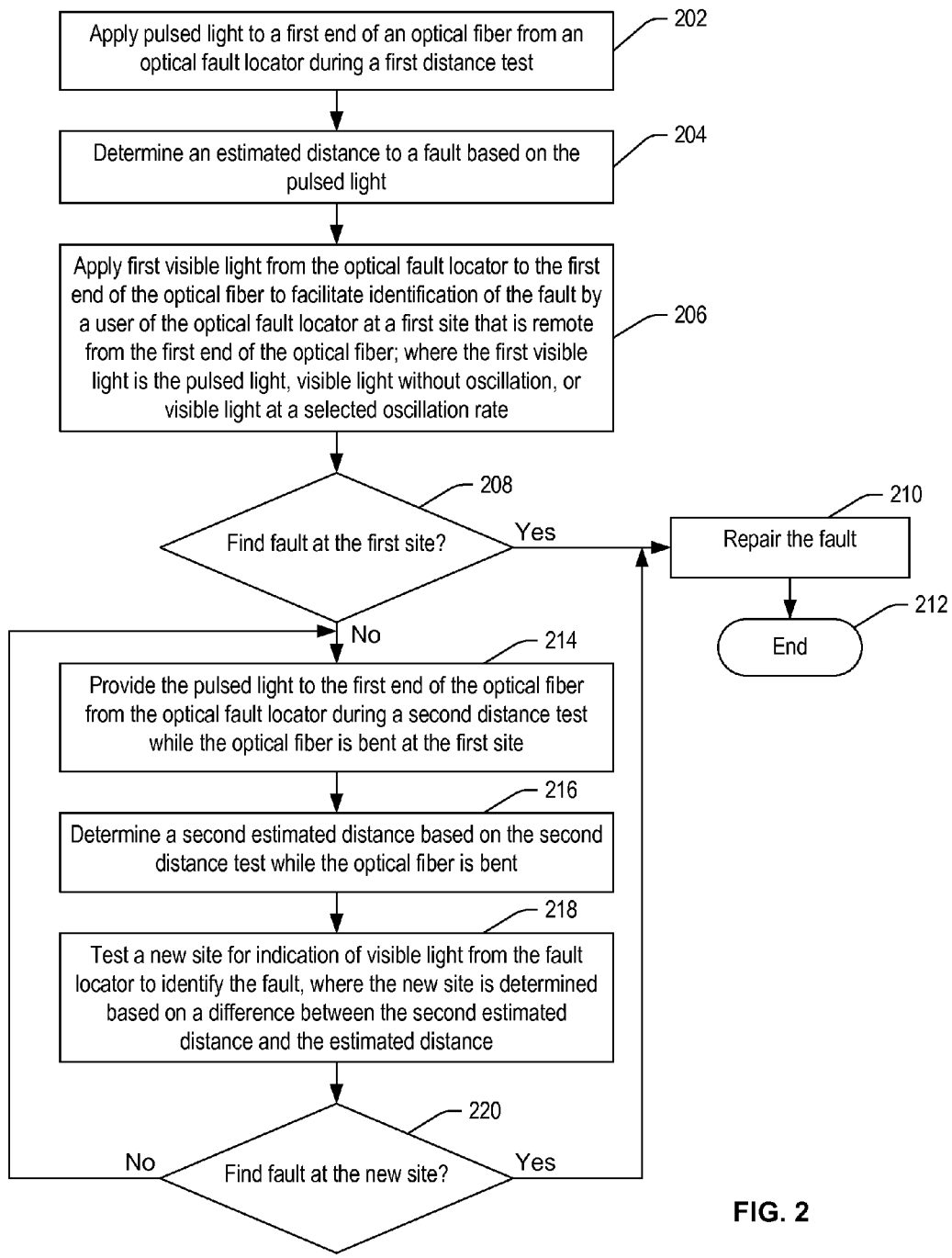
FIG. 2 is a flow chart of a first particular embodiment of a method of finding a fault in an optical fiber using an optical fault locator.

Referring to FIG. 2, a flow chart of a first particular embodiment of a method of finding a fault in an optical fiber using an optical fault locator is shown. The method may be performed, for example, using the optical fault locator 102 depicted in FIG. 1. Knowledge that the fault exists in the optical fiber may be based on a customer complaint, based on diagnostic indicators (e.g., an indication that a multiplex circuit to the customer has changed to a simplex circuit), or based on combinations thereof. A user may couple a connector of the optical fault locator to an end of the optical fiber. The user may be a repair technician. The end of the optical fiber may be located at or near a customer premises or at or near communication equipment associated with a communication provider (e.g., at a central office of a communication service provider).

At 202, pulsed light may be provided to a first end of the optical fiber from the optical fault locator during a distance test. In a particular embodiment, the pulsed light may be light in a wavelength range that is not visible to the human eye. In another embodiment, the pulsed light may be light in a wavelength range that is visible to the human eye. The optical fault locator may determine an estimated distance to a fault based on the pulsed light, at 204. An indicator of the estimated distance may be sent to a display of the optical fault locator, may be sent to a device associated with the user, may be sent one or more other devices, or combinations thereof. The user may perform the first distance test when the user is in the vicinity of the optical fault locator. Alternately, the user may initiate the first distance test remotely. The user may confirm that a result of the distance test is obtainable from the device associated with the user while the user is still in the presence of the optical fault locator and not at a location remote from the optical fault locator. When the user confirms that results of the distance test are obtainable from the device associated with the user, the user may move to a first site remote from the optical fault locator.

The estimated distance may indicate to the user whether an optical detector should be used to identify a location of the fault based on visible light applied to the first end of the optical fiber. For example, when the estimated distance indicates that the distance to the fault is about 15 kilofeet or greater, the optical detector may be used to detect visible light applied to the optical fiber during a visual fault location test. In another example, when the estimated distance indicates that the distance to the fault is about 15 kilofeet or less, the user may be able to visually detect the fault without the use of the optical detector.

First visible light from the optical fault locator may be provided to the first end of the optical fiber to facilitate identification of the fault by the user of the optical fault locator at the first site that is remote from the first end of the optical fiber, at 206. The visible light may be applied to the optical fiber during the visual fault location test. The visible light may be the pulsed light, visible light without oscillation, or visible light at a selected oscillation rate. In a particular embodiment, the user can configure the optical fault detector to use light having particular characteristics for the visual fault location test. For example, the user may specify a selected oscillation rate, a selected pulse length, a selected pulse pattern, a selected wavelength of light, or a combination thereof. When the optical detector is used, information about the particular characteristics may be provided to the optical detector to facilitate identification of the light applied by the optical fault locator to the optical fiber. To illustrate, when the optical detector is used, the user provides input to the optical detector that a selected oscillation rate of light is to be used for the visual fault location test. The user may couple the optical detector to a portion of the optical fiber and move the optical detector axially along the optical fiber. The location of the fault may be indicated when the optical detector detects light from the optical fiber having the selected oscillation rate. The optical detector may not be used when the fault is located at a portion of the optical fiber where the user is able to see the light being emitted from the optical fiber.

At 208, a determination may be made whether the fault in the optical fiber is at the first site. For example, presence or absence of the fault at the first site may be visually determined by the user or may be determined using the optical detector. When the fault is detected at the first site, the user may repair the fault, at 210. The method may end, at 212.

When the fault is not found at the first site, at 208, the user may bend the optical fiber at or near the first site. Bending the optical fiber may create a region of loss that causes a portion of light applied to the optical fiber to be reflected back towards the source of the light. When the optical fiber is bent at the first site, the optical fault locator may be initiated to apply the pulsed light to the first end of the optical fiber during a second distance test, at 214. In a particular embodiment, the second distance test may be initiated by the user from the first site (i.e., remotely from a location of the optical fault locator). The optical fault locator may determine a second estimated distance based on the second distance test while the optical fiber is bent, at 216.

At 218, a new site is tested for indication of visible light from the optical fault locator to identify the fault. A location of the new site may be determined based on a difference between the estimated distance and the second estimated distance. For example, when the difference between the estimated distance and second estimated distance is a significant (e.g., greater than expected measurement error) positive number, the result of the second distance test (e.g., the second distance) may be a distance from the optical fault locator to the bend in the optical fiber formed by the user. Accordingly, the bend may be between the optical fault locator and the fault and the new site may be further away from the optical fault locator than the bend. The difference may indicate an approximate distance that the user should move from the bend to the new site. When the difference between the estimated distance and the second estimated distance is about zero (e.g., within expected measurement error), the result of the second distance test indicates a distance from the optical fault locator to the fault, and the new site may be closer to the optical fault locator than the bend.

When the user is at the new site, second visible light from the optical fault locator may be applied to the first end of the optical fiber to facilitate identification of the fault by the user. A determination may be made whether the fault is located in the portion of the optical fiber at the new site, at 220. When the fault is not at the new site, the method may return to 214. When the fault is at the new location, the fault may be repaired, at 210, and the method may end, at 212.

Figure 3:
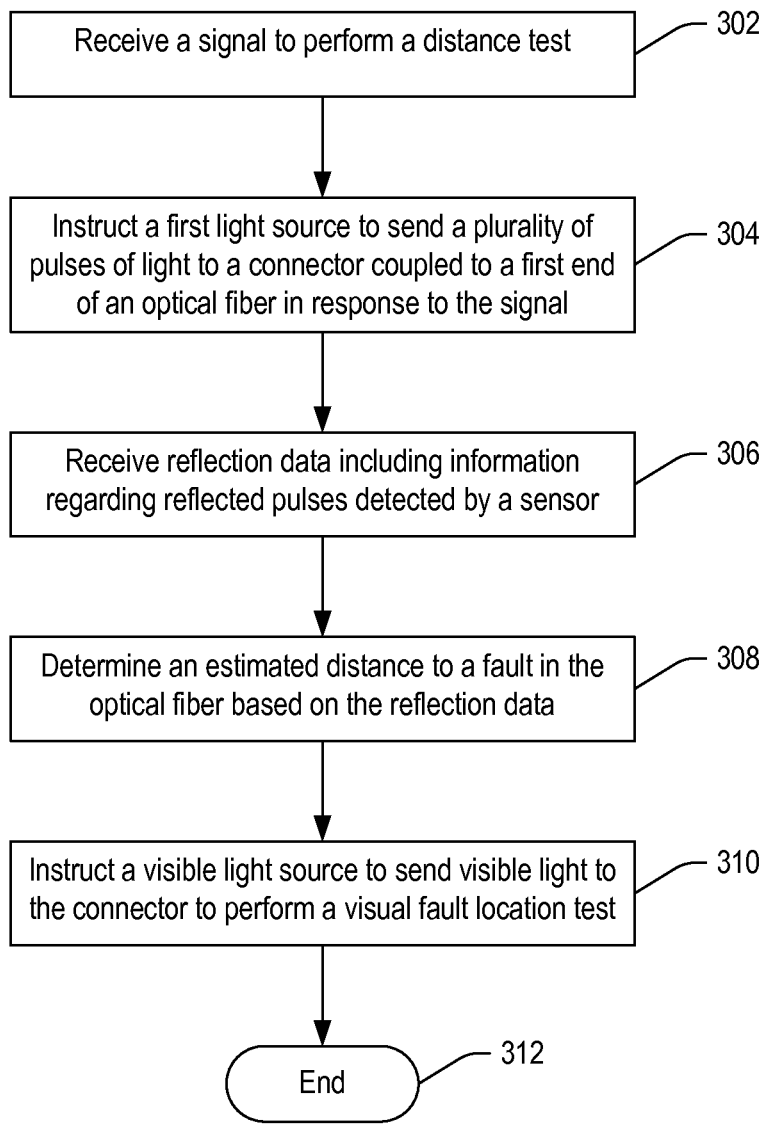
FIG. 3 is a flow chart of a second particular embodiment of a method of finding a fault in an optical fiber using an optical fault locator.

Referring to FIG. 3, a flow chart of a second particular embodiment of a method of finding a fault in an optical fiber using an optical fault locator is shown. The method may be performed by a processor of the optical fault locator that executes instructions from a tangible computer-readable medium (e.g., the processor 112 of the optical fault locator 102 of FIG. 1 may execute instructions from the memory device 140). A first end of the optical fiber may be coupled to a connector of the optical fault locator.

At 302, a signal may be received at the processor to perform a distance test. For example, the signal may be received in response to a user input at the optical fault locator (e.g., the user selecting a distance test icon on a display, the user typing a command to run the distance test, the user pushing a distance test initiator of the optical fault locator, or combinations thereof). In another example, the signal may be received from a remotely-located device that is associated with the user of the optical fault locator.

A first light source may be instructed by the processor to send a plurality of pulses of light to the connector coupled to the first end of the optical fiber in response to the signal, at 304. In an embodiment, the optical fault locator may provide the plurality of pulses of light to the connector for a predetermined period of time during the distance test (e.g., the optical fault locator may run in a single test mode). The predetermined period of time may be 10 minutes, 5 minutes, 3 minutes, 1 minute, or any other period of time. After completion of the predetermined period of time, the first light source may stop providing the pulses of light to the connector. In another embodiment, the optical fault locator may provide the plurality of pulses of light to the connector until the optical fault locator receives a command to stop the distance test from the user of the optical fault locator (e.g., the distance test may run in a real-time mode). In another embodiment, the optical fault locator may provide the plurality of pulses of light to the connector for a first predetermined period of time, and then the optical fault locator may provide visible light to the connector for a visual fault test for a second predetermined period of time. At the end of the second predetermined period of time, the optical fault locator may revert back to providing a plurality of pulses of light for another first period of time. The optical fault locator may continue to switch between the distance test for the first predetermined period of time and the visual test for the second predetermined period of time until the optical fault locator receives an interrupt command from the user (e.g., the optical fault locator may run in a reciprocating test mode). The optical fault locator may include a selector that allows the user to select between the single test mode for the distance test, the real-time mode for the distance test, and the reciprocating distance test and visual fault test mode.

In an embodiment, the first light source may provide light to the optical fiber in a visible spectrum (e.g., one or more wavelengths of light that are visible to the human eye, such as light at 680 nm) during the distance test. In another embodiment, the first light source may provide light to the optical fiber in a non visible spectrum (e.g., one or more wavelengths of light that are not visible to the human eye, such as light at a wavelength in a range from about 860 nm to 1560 nm). In another embodiment, the first light source may provide light to the optical fiber in a visible spectrum and in a non visible spectrum, concurrently or simultaneously. The optical fault locator may include a selector that allows the user to choose what wavelength of light is applied to the connector during the distance test.

The processor may receive reflection data including information regarding reflected pulses detected by a sensor, at 306. The reflection data may include information regarding the time when pulses were sent, strength or intensity of reflected pulses, the time when the reflected pulses were received by the sensor, or a combination thereof. Based on the reflection data, the processor may determine an estimated distance to the fault in the optical fiber, at 308. The processor may detect the location of the fault by integrating the strength or intensity of the reflected pulses as a function of time. The distance may correspond to a distance to a nearest region of the optical fiber from which strong reflected pulses where received. An indicator of the distance may be sent to a display of the optical fault locator, may be sent to a device associated with the user, may be sent one or more other devices, or combinations thereof.

At 310, the processor may instruct a second light source to send visible light to the connector to perform a visual fault location test. The visible light may enable the user to locate the fault during the visual fault location test. The visual fault location test may be initiated automatically after completion of the distance test or upon receipt of a signal to initiate the visual fault location test. The user may initiate the visual fault location test at the optical fault locator or from a remote location (e.g., using a remote control device). For example, the user may initiate the visual fault location test remotely when the user is at a site that includes a region of the optical fiber where the fault may be located based on the distance test. The site may be a location where the optical fiber is accessible to the user (e.g., at a splice closure, equipment room, or other access point). Light from the visible light source may be applied to the connector for a predetermined period of time during the visual fault location test. For example, the predetermined period of time may be 10 minutes, 5 minutes, 3 minutes, 1 minute, or any other period of time. The visible light may be interrupted when the optical fault locator receives an interrupt signal. The interrupt signal may be received at the optical fault locator from the device associated with the user after the user identifies the location of the fault or determines that the fault is not at the site. Additionally, the visible light may have characteristics that are specified by the user using one or more input devices of the optical fault locator or using an input device of the remotely-located device associated with the user.

In an embodiment, the first light source is the same as the second light source and the visible light sent to the connector may have the same spectrum as the pulses of light sent to the connector for the distance test. In this embodiment, the user may identify the fault during the distance test or during the visual fault location test based on light sent to the connector. The user may visually identify the location of the fault or the user may use an optical detector to determine the location of the fault. An optical detector may be used, for example, when attenuation of the light due to the distance from the optical fault locator to the fault makes the light at the fault difficult to detect or non-detectable by the human eye. The user may specify one or more pulse rates of visible light to be used during the visual fault location test to ensure that light detected by the optical detector is the visible light sent during the visual fault location test. To illustrate, the user may select a pulse rate of 270 Hz. The user may use the optical detector to find a location where light is emitted from the optical fiber. In this illustration, the user receives a strong indication that the optical detector is located near the fault when the optical detector indicates that light having a pulse rate 270 Hz is detected by the optical detector. The user may switch the pulse rate to another pulse rate and confirm that the detected light is at the new pulse rate to further confirm that the optical detector is located near the fault. After the user changes the pulse rate, if the optical detector continues to detect light at pulses at 270 Hz, the user may continue to try to locate the fault. When the user visually detects the fault, the user may modify one or more characteristic of the light applied by the optical fault locator to the optical fiber to confirm that the light emitted at the detected light has the modified characteristics.

In an embodiment, the first light source is different than the second light source. For example, the first light source may provide the pulses of light in a spectrum that is not visible to the human eye. In this example, the visible light from the second light source may be applied to the connector after completion of the distance test or during the distance test (i.e., concurrently with the pulses of light from the first light source). The method may end at 312.

Various embodiments disclosed herein describe an optical fault locator that may take the place of a visual fault locator and a separate optical time domain reflectometer. The optical fault locator may be a standalone device. The optical fault locator may be a portable device or may be a frame mounted device coupled to communication equipment in a central office of a service provider. The optical fault locator may enable a technician to identify a fault in an optical fiber more efficiently. For example, the technician does not have to repeatedly return to a first end of an optical fiber to change instruments when determining the location of the fault. The optical fault locator may enable the technician to remotely switch between a distance test mode and a visual fault test mode from locations distant from the optical fault locator.

Further, the optical fault locator may enable the technician to remotely modify parameters of the distance test, the visual fault test, or both.

Figure 4:
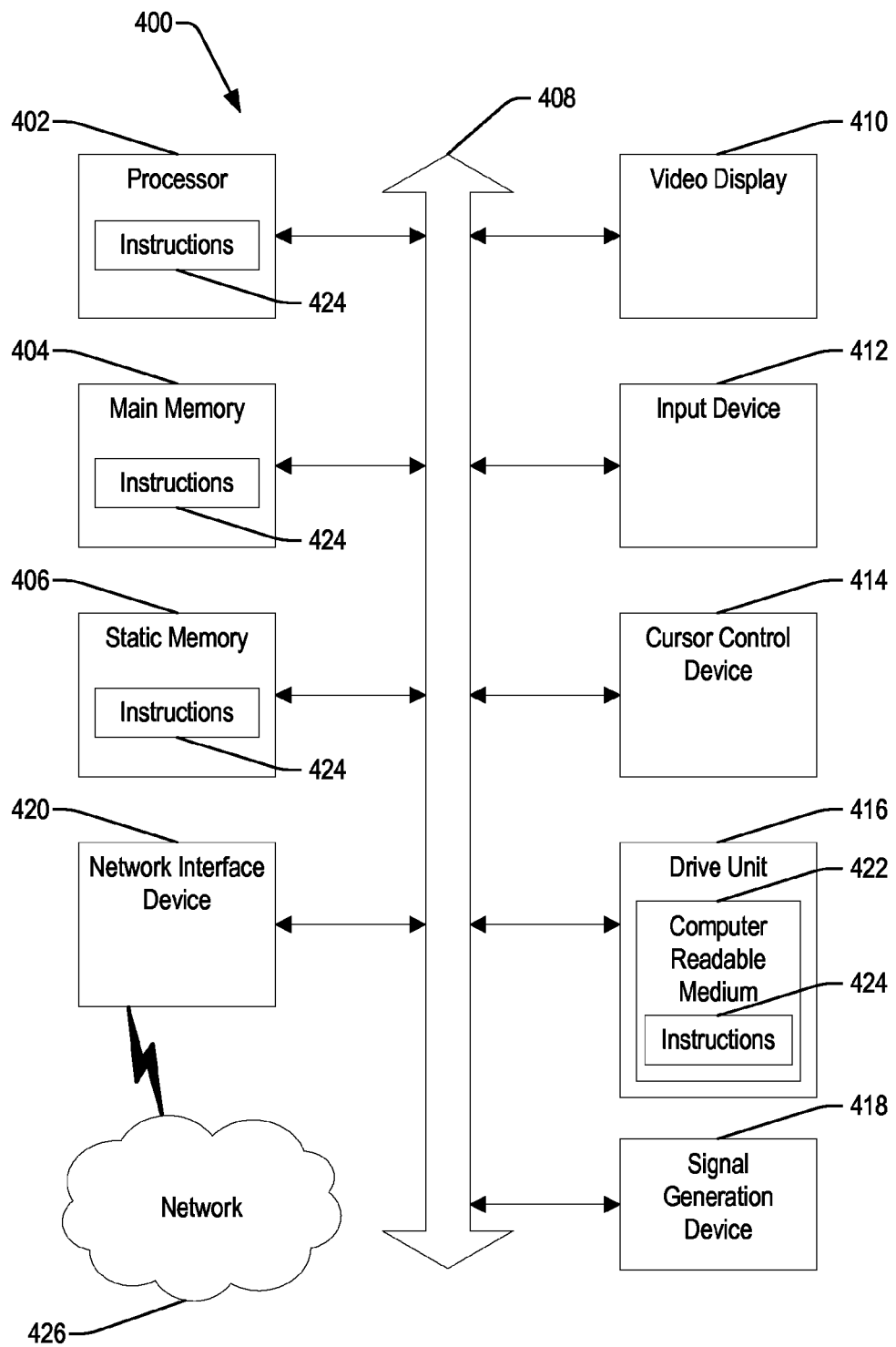
FIG. 4 is a block diagram of an illustrative embodiment of a general computer system.

Referring to FIG. 4, an illustrative embodiment of a general computer system is shown and is designated 400. The computer system 400 may include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the optical fault locator 102, the server 128, the device 130, and the optical detector 154 described with reference to FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 400 may be implemented using electronic devices that provide video, audio, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 may include a main memory 404 and a static memory 406, which can communicate with each other via a bus 408. As shown, the computer system 400 may further include a video display unit 410, such as a liquid crystal display (LCD) or a solid state display. Additionally, the computer system 400 may include an input device 412, such as a keyboard, and a cursor control device 414, such as a mouse. The computer system 400 may also include a disk drive unit 416, a signal generation device 418, such as a speaker or remote control, and a network interface device 420. Some computer systems 400 may not include an input device (e.g., a server may not include an input device).

In a particular embodiment, as depicted in FIG. 4, the disk drive unit 416 may include a computer-readable non-transitory storage medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable non-transitory storage media. For example, the computer-readable non-transitory storage medium 422 may be the memory device 140 of FIG. 1.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 400. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium that stores instructions 424 or receives, stores and executes instructions 424, so that a device connected to a network 426 may communicate voice, video or data over the network 426. Further, the instructions 424 may be transmitted or received over the network 426 via the network interface device 420.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a connector configured to couple to an optical fiber;
   a light source coupled to the connector;
   a selector operable to change a mode between a distance test operating mode and a visual test operating mode;
   an oscillator that is operable in the distance test operating mode to send pulses of light from the light source to a first end of the optical fiber;
   a sensor coupled to the connector, wherein the sensor is operable in the distance test operating mode to detect light reflected by a fault in the optical fiber;
   a processor that is operable in the distance test operating mode to determine an estimated distance to the fault at a first site in response to the sensor detecting the light reflected by the fault, wherein the processor is further operable in the distance test operating mode, when the fault is not identified at the first site, to determine a second estimated distance while the optical fiber is bent near the first site, wherein
   a difference between the estimated distance and the second estimated distance is used to determine a second site; and
   a receiver configured to cause the selector to change the mode to the distance test operating mode in response to remote selection of the distance test operating mode and further configured to cause the selector to change the mode to the visual test operating mode in response to remote selection of the visual test operating mode, wherein the remote selection is wirelessly communicated to the receiver;
   wherein visible light from the light source is provided to the optical fiber in the visual test operating mode.

2. The device of claim 1, further comprising a transmitter to electronically send to a remote device information indicative of the estimated distance to the fault.

3. The device of claim 1, further comprising a second selector to set a pulse rate for the visible light applied to the optical fiber from the light source in the visual test operating mode.

4. The device of claim 3, wherein the receiver is further configured to cause the second selector to set the pulse rate in response to a signal received from a remote location.

5. The device of claim 1, wherein the receiver is responsive to signals sent by a dedicated remote device.

6. The device of claim 1, further comprising a display device coupled to the processor to display information indicating the estimated distance.

7. The device of claim 1, further comprising a third selector to select at least one human visible wavelength of the visible light generated by the light source.

8. A method comprising:
   applying pulsed light to a first end of an optical fiber from an optical fault locator during a first distance test;
   determining an estimated distance to a fault based on the pulsed light;
   sending information indicative of the estimated distance to a remote device;
   applying first visible light from the optical fault locator to the first end of the optical fiber to facilitate identification of the fault at a first site that is remote from the first end of the optical fiber; and
   in response to the fault not being detected at the first site:
      receiving a signal from the remote device to initiate a second distance test;
      applying pulsed light to the first end of the optical fiber from the optical fault locator during the second distance test while the optical fiber is bent at the first site and
      determining a second estimated distance based on the second distance test, wherein a difference between the estimated distance and the second estimated distance is used to determine a second site.

9. The method of claim 8, wherein the pulsed light is detectable by a human eye and wherein the pulsed light enables a user to identify the fault at the first site.

10. The method of claim 9, wherein the pulsed light is the first visible light.

11. The method of claim 8, wherein the pulsed light is not detectable by a human eye, and wherein the pulsed light and the first visible light are provided concurrently to the optical fiber.

12. The method of claim 8, wherein the first visible light is provided to the optical fiber automatically after the first distance test is completed.

13. The method of claim 8, further comprising detecting the first visible light applied to the optical fiber using an optical detector at the first site.

14. The method of claim 8, further comprising applying second visible light to the optical fiber with the optical fault locator after the second distance test to facilitate identification of the fault at the second site.

15. The method of claim 14, wherein the first visible light is pulsed at a first pulse rate and the second visible light is pulsed at a second pulse rate, and wherein the first pulse rate is equal to the second pulse rate.

16. The method of claim 14, wherein the first visible light is pulsed at a first pulse rate and the second visible light is pulsed at a second pulse rate, and wherein the first pulse rate is different than the second pulse rate.

17. A computer-readable memory instructions executable by a processor to cause the processor to perform operations comprising:

receiving a signal from a remote device to set an operating mode to a distance test operating mode or to a visual fault location operating mode, wherein the signal from the remote device is received via a wireless communication system;

in response to the operating mode being set to the distance test operating mode:

instructing a first light source to send a plurality of pulses of light to a connector coupled to a first end of an optical fiber in response to the signal;

receiving reflection data including information regarding reflected pulses detected by a sensor;

determining an estimated distance to a fault in the optical fiber at a first site based on the reflection data;

determining, when the fault is not identified at the first site, a second estimated distance to the fault while the optical fiber is bent near the first site, wherein a difference between the estimated distance and the second estimated distance is used to determine a second site; and in response to the operating mode being set to the visual fault location operating mode:

instructing a second light source to send visible light to the connector to perform a visual fault location test.

18. The computer-readable memory of claim 17, wherein the first light source and the second light source are the same light source and wherein the plurality of pulses include a spectrum of light visible to a human eye.

* * * * *